United States Patent [19]

Tsuda

[11] 4,173,065
[45] Nov. 6, 1979

[54] METHOD OF MANUFACTURING A MAGNETIC HEAD

[75] Inventor: Naotsune Tsuda, Hachioji, Japan

[73] Assignee: Olympus Optical Co., Ltd., Tokyo, Japan

[21] Appl. No.: 886,336

[22] Filed: Mar. 14, 1978

[51] Int. Cl.² ............................................. G11B 5/42
[52] U.S. Cl. ...................................... 29/603; 29/418
[58] Field of Search ................. 29/603, 418; 360/119, 360/120, 121

[56] References Cited

U.S. PATENT DOCUMENTS

| 3,375,575 | 4/1968 | Visser et al. | 29/603 |
| 3,605,258 | 9/1971 | Fisher et al. | 29/603 |
| 3,634,933 | 1/1972 | Hanak | 29/603 |
| 4,040,174 | 8/1977 | Tsuda | 29/603 |

Primary Examiner—Carl E. Hall
Attorney, Agent, or Firm—Toren, McGeady and Stanger

[57] ABSTRACT

A method of manufacturing a magnetic head comprises the steps of forming between a pair of core blocks to be joined together gap holding surfaces arranged relative to a gap forming surface, in the core blocks, such that gaps formed between the gap holding surfaces, within which spacers are placed, will be wider than the gap formed between the gap forming surfaces between which there is provided a molten gap forming material forming an effective magnetic gap in the finished head having a width of about 1μ by slightly permeating the molten gap forming material within the core block.

4 Claims, 7 Drawing Figures

METHOD OF MANUFACTURING A MAGNETIC HEAD

BACKGROUND OF THE INVENTION

1. Field of the Invention

The present invention relates to a method of manufacturing a magnetic head.

2. Description of the Prior Art

Heretofore, a method of manufacturing a magnetic head has included the steps of placing a pair of core blocks each having a gap forming surface in overlapped position one upon the other and inserting a spacer having a thickness corresponding to a gap to be formed between gap forming surfaces of the blocks. A gap forming material such as glass or the like is placed within the gap and caused to become molten. Solidification of this material will define a gap between both the gap forming surfaces and as a result the magnetic gap for the magnetic head is formed. The core blocks, thereafter, are cut off and a plurality of magnetic cores are obtained.

The spacer for forming a gap, however, is very thin having a dimension of about $1\mu$, and it is terribly difficult and troublesome to perform finishing operation while maintaining a constantly uniform size and precision with a spacer of such thickness. Other methods have proceeded without the use of a spacer with the core material at the gap forming surface being removed to enable formation of the effective gap by etching or polishing, but even in this method, uniform finishing is difficult.

SUMMARY OF THE INVENTION

An object of the present invention is to eliminate the above disadvantageous of the conventional methods.

Another object of the present invention is to provide a method manufacturing of a magnetic head in which the spacer is relatively thick, gap precision is improved, handling is easy and a gap joining surface is not damaged even when polishing the core.

According to the present invention a method of manufacturing a magnetic head comprises steps of forming a gap holding surface at a different level than a gap forming surface in core blocks, whereby a gap formed by a spacer placed between the gap holding surfaces will be narrower than the thickness of the spacer, filling a molten gap forming material into the gap as formed between the gap forming surfaces and forming an effective gap having a width of about $1\mu$ by slightly permeating the molten gap forming material within the core block. Both core blocks have gap holding surfaces, the level of which is made lower than the level of the gap forming surface. A groove is formed between the gap forming surface and the gap holding surface for receiving the residue of the melted gap forming material.

DESCRIPTION OF THE PREFERRED EMBODIMENT

Figure 1:
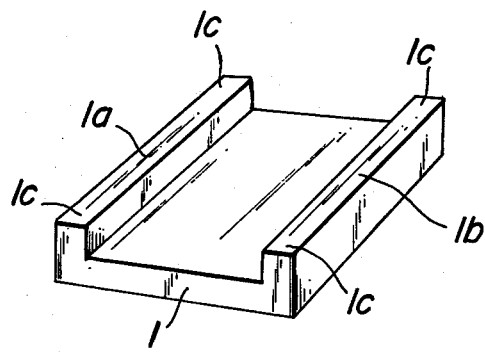
FIGS. 1 and 2 are perspective views of a core block used in one embodiment of the present invention.
Figure 2:
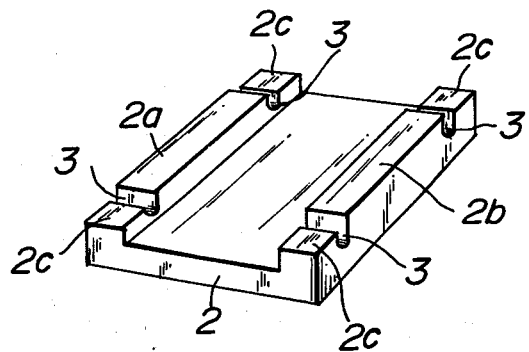

Referring now to FIGS. 1 and 2 one embodiment of a method of manufacturing a magnetic head according to the present invention is shown.

Core blocks 1, 2 consist of sintering oxide magnetic material such as ferrite used in the method according to the invention. The first core block 1 is provided with gap forming surfaces 1a, 1b and gap holding surfaces 1c positioned on both ends of 1a, 1b on the same plain surface to form a so-called U-shape in cross-section.

The second core block 2 is formed in the same manner as the above first core block 1, but gap forming surfaces 2a, 2b are formed wider than the gap forming surfaces 1a, 1b of the first core block 1, and the gap holding surfaces 2c are formed lower than the gap forming surfaces 2a, 2b by a predetermined dimension D.

Figure 3:
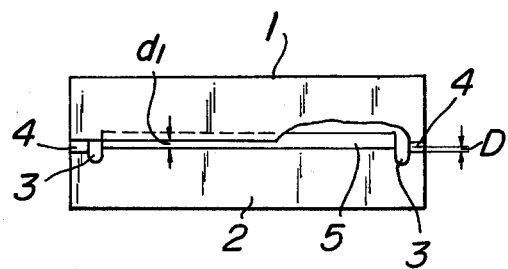
FIGS. 3 and 4 are partially cutaway side and front views showing the state of overlapping the core blocks one upon the other.
Figure 4:
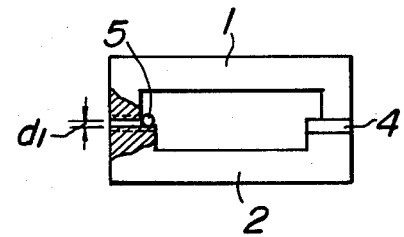

That is, the gap holding surface 2c is formed at the position lower than the gap forming surfaces 2a, 2b by a predetermined dimension D, and between the gap holding surface 2c and the gap forming surfaces 2a, 2b are bored partition grooves 3, respectively. As shown in FIGS. 3 and 4 in case of overlapping the thus formed core blocks 1, 2, a spacer 4 for setting a gap $d_1$ between the gap forming surfaces 1a, 2a and 1b, 2b is slightly thicker than the dimension D.

On four gap holding surfaces 2c of the thus formed second core block 2 are fixed the spacers 4 with the use of adhesives or the like, and on the spacer 4 is placed the first core block 1 which positions the gap holding surface 1c, so that the optical gap $d_1$ is formed between respective gap forming surfaces.

In a case where the gap $d_1$ is sized for instance with a dimension of $0.5\mu$, the dimension D between the gap holding surface 2c and the gap forming surface 2a, 2b is determined to be about $1.5\mu$ and a thickness of the spacer 4 is determined to be about $2\mu$, with the optical gap $d_1$ being formed as indicated.

After the gap $d_1$ is thus formed between the gap forming surfaces, as shown in FIGS. 3 and 4, a bar-like gap forming material 5 consisting of glass or ceramics is arranged on the gap forming surface 2a, 2b of the second core block for adjoining and extending between the gap forming surfaces. When the entire core block is heated to a melting point of the gap forming material 5 in an inert gas atmosphere such as nitrogen or the like, the gap forming material 5 is rendered into a molten state and it is caused to become permeated into the gap by a capillary phenomenon. In this case, the gap forming material 5 is slightly permeated into the core block 1, 2 by a dimension $d_2$ (for instance, about $0.1$–$0.25$ $\mu$) from the gap forming surface 1a, 1b, 2a, 2b by a capillary phenomenon, while the excessive or residue material is charged and maintained in the partition groove 3.

Figure 7:
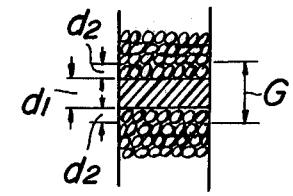
FIG. 7 is a partly enlarged explanatory view of the same embodiment.

At the time when the gap forming material 5 is molten and filled in the gap $d_1$ and permeated in the core block, the whole assembly is gradually cooled, and then the gap forming material 5 is coagulated and both the core blocks 1, 2 are bonded. In this case, the total gap, i.e., a gap $d_1$, formed between the gap forming surfaces 1a, 2a or 1b 2b and the widths $d_2$ where the gap forming material 5 has permeated in the gap forming surface are combined as an effective or total gap width, so that $d_1 + 2d_2$ becomes an effective gap G as shown in FIG. 7.

Figure 5:
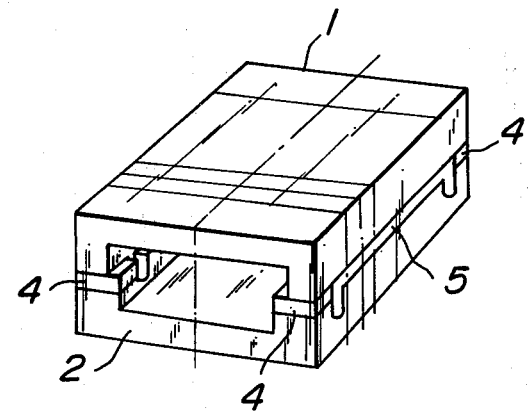
FIG. 5 is a perspective view of the same embodiment on the way of the process.
Figure 6:
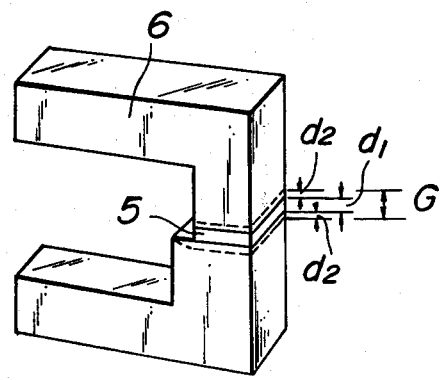
FIG. 6 is a perspective view showing the core obtained by the same embodiment.

The core blocks 1, 2 are thus formed cut into certain lengths as shown by dotted lines in FIG. 5 and cores such as the core 6 shown in FIG. 6 are obtained. In this case, the width $d_2$ where the gap forming material is permeated in the core to the gap $d_1$ does not act as a magnetic core but rather as part of a magnetic gap, so that the effective gap G is the gap $d_1$ plus the widths $d_2$ permeated in the first and second core blocks. After polished and finished the tape contact surface of the core 6 which has an effective gap which is less than $1\mu$, a back core leg has a coil wound therearound and is fixed to a holder (not shown) and the magnetic head is finished. In manufacturing the magnetic head in this manner and polishing the tape contact surface of the core as shown in FIG. 6, there has occured a problem of breaking of the core caused by a difference of abrasion strength between the core and the gap forming material on the tape contact surface. However, according to the present invention, the gap forming material is permeated into the core, so that the strength of the tape contact surface with the optical gap can be increased and there is no possibility of breaking off the core even during polishing and a core having high precision can be obtained.

The gap holding surface, as viewed in FIG. 2 is formed lower than the gap forming surface by a predetermined dimension and the spacer is formed thicker to extend to the lower level dimension, so that a thicker spacer can be utilized with high precision. Handling facility and working efficiency will thereby be significantly increased. The gap formed between the gap forming surfaces in case of overlapping the core blocks can be set to be less than $1\mu$ because the gap holding surface is lower than the gap forming surface formed. Accordingly, the optical gap can be determined to be an optional value in accordance with the dimension where the molten gap forming material is permeated into the core block, thereby enabling manufacturing of a magnetic head with the effective gap of less than $1\mu$.

The optical gap can be narrowed to less than $1\mu$, but a gap of about $1\mu$ is preferable from the viewpoint of efficiency of the magnetic head, so that the effective gap is made by combining the optical gap with the width where the gap forming material is permeated in the core block.

The present invention is not limited to the above embodiments, and the lower gap holding surface can be formed on both core blocks.

I claim:

1. A method of manufacturing a magnetic head comprising steps of providing a pair of core blocks arranged facing each other and each having a gap forming surface and gap holding surfaces formed on each core block, providing spacers between the gap holding surfaces of the core blocks, setting the thickness of the spacers and the space between the gap holding surfaces to make an optical gap between the gap forming surfaces, and melting and permeating a gap forming material into the optical gap in such a manner that the melted gap forming material is slightly permeated into the core blocks along the gap forming surfaces, the gap holding surfaces being formed relative to the gap forming surfaces to provide a wider spacing between the gap holding surfaces thereby to enable utilization of spacers thicker than the spacing formed between the gap forming surfaces.

2. A method of manufacturing a magnetic head as claimed in claim 1, wherein both core blocks have gap holding surfaces, the level of which is located differently than the level of the gap forming surface.

3. A method of manufacturing a magnetic head as claimed in claim 1, wherein a groove is formed between the gap forming surface and the gap holding surface for receiving the residue of the melted gap forming material.

4. A method of manufacturing a magnetic head as claimed in claim 1 wherein one of said core blocks has at least one gap forming surface and at least one gap holding surface which are wider than a gap forming surface and a gap holding surface, respectively, of the other core block.

* * * * *

UNITED STATES PATENT OFFICE
CERTIFICATE OF CORRECTION

Patent No. 4,173,065        Dated November 6, 1979

Inventor(s) NAOTSUNE TSUDA

It is certified that error appears in the above-identified patent and that said Letters Patent are hereby corrected as shown below:

In the heading of the Patent [30] should read as follows:

[30] Foreign Application Priority Data
March 16, 1977   JAPAN ......... 52-28967

Signed and Sealed this

Twenty-second Day of April 1980

[SEAL]

Attest:

SIDNEY A. DIAMOND

*Attesting Officer*      *Commissioner of Patents and Trademarks*